United States Patent
Veryser et al.

(10) Patent No.: US 10,265,782 B2
(45) Date of Patent: Apr. 23, 2019

(54) CUTTING TOOL FOR CUTTING AND COUNTERSINKING HOLES

(71) Applicant: Link Industries, Indian River, MI (US)

(72) Inventors: Jeffrey J. Veryser, Charlevoix, MI (US); Wayne Rocheleau, Cheboygan, MI (US); Dwaine D. Lee, Pellston, MI (US); John Grzebyk, East Jordan, MI (US)

(73) Assignee: Link Industries, Indian River, MI (US)

( * ) Notice: Subject to any disclaimer, the term of this patent is extended or adjusted under 35 U.S.C. 154(b) by 42 days.

(21) Appl. No.: 15/395,265

(22) Filed: Dec. 30, 2016

(65) Prior Publication Data

US 2018/0185932 A1 Jul. 5, 2018

(51) Int. Cl.
| | |
|---|---|
| *B23B 51/02* | (2006.01) |
| *B23B 51/08* | (2006.01) |
| *B23B 51/10* | (2006.01) |

(52) U.S. Cl.
CPC .............. *B23B 51/02* (2013.01); *B23B 51/08* (2013.01); *B23B 51/105* (2013.01); *B23B 2251/043* (2013.01); *B23B 2251/241* (2013.01); *B23B 2251/406* (2013.01)

(58) Field of Classification Search
CPC ....... B23B 51/00; B23B 51/10; B23B 51/108; B23B 51/101; B23B 51/102; B23B 51/105; Y10T 408/909; Y10T 408/9095; Y10T 408/9097

See application file for complete search history.

(56) References Cited

U.S. PATENT DOCUMENTS

| | | | | |
|---|---|---|---|---|
| 252,704 | A | * 1/1882 | Southwick | ............ B23B 51/108 408/223 |
| 1,070,425 | A | * 8/1913 | Darling | ................ B23B 51/108 408/223 |
| 2,372,719 | A | * 4/1945 | Freese | .................. B23B 51/108 408/223 |
| 2,403,861 | A | 7/1946 | Klemm | |
| 2,829,543 | A | 4/1958 | Bergstrom | |
| 2,829,544 | A | * 4/1958 | Bergstrom | ............. B23B 51/10 408/225 |
| 2,897,695 | A | * 8/1959 | Winslow | ............... B23B 51/108 408/223 |

(Continued)

FOREIGN PATENT DOCUMENTS

| | | |
|---|---|---|
| EP | 2915613 A1 | 9/2015 |
| GB | 1360173 A * | 7/1974 ............. B23B 51/10 |

(Continued)

*Primary Examiner* — Nicole N Ramos
(74) *Attorney, Agent, or Firm* — Christopher G. Darrow; Darrow Mustafa PC

(57) ABSTRACT

A cutting tool is configured to cut and countersink a hole in a workpiece. The cutting tool includes a shank and a fluted body extending along an axis. The body includes a tip, a chamfer in an axially spaced relationship with the tip and a cross hole with a proximal end opening to the chamfer. The body has a cutting section extending between the tip and the chamfer, and a countersinking section extending along the chamfer. At the cutting section, the body includes at least one hole-cutting edge. At the countersinking section, the body includes a scalloped countersink-cutting edge along a junction of the chamfer and the proximal end of the cross hole.

20 Claims, 3 Drawing Sheets

(56) References Cited

U.S. PATENT DOCUMENTS

| | | | | |
|---|---|---|---|---|
| 2,898,787 A | * | 8/1959 | Hofbauer | B23B 51/107 408/226 |
| 3,022,686 A | * | 2/1962 | Rowley | B23B 51/10 408/199 |
| 3,233,260 A | | 2/1966 | Halpern | |
| 3,248,975 A | * | 5/1966 | Breuning | B23B 51/10 140/3 R |
| 3,444,766 A | * | 5/1969 | Eriksson | B23B 51/10 408/211 |
| 3,473,421 A | * | 10/1969 | Grussner | B23B 51/10 408/211 |
| 3,575,520 A | | 4/1971 | Halpern | |
| 3,778,180 A | * | 12/1973 | Ostrom | B23B 51/02 408/226 |
| 2010/0254779 A1 | * | 10/2010 | Wedner | B23B 51/009 408/224 |

FOREIGN PATENT DOCUMENTS

| | | | | |
|---|---|---|---|---|
| JP | 61100307 A | * | 5/1986 | B23B 51/108 |
| JP | 02190209 A | * | 7/1990 | B23B 51/10 |
| RU | 1804960 A1 | * | 3/1993 | B23B 51/00 |

* cited by examiner

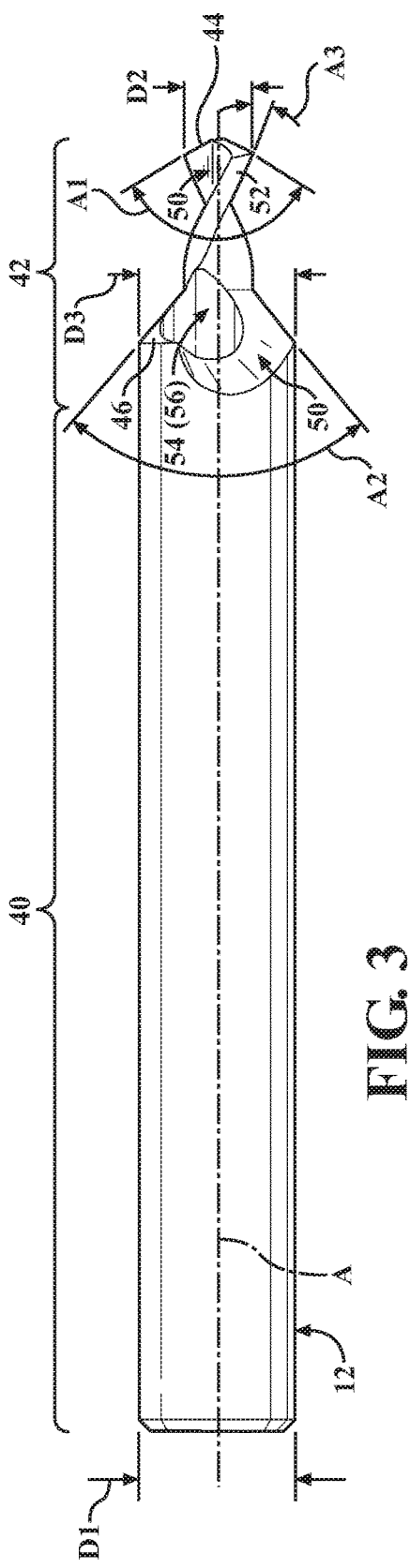
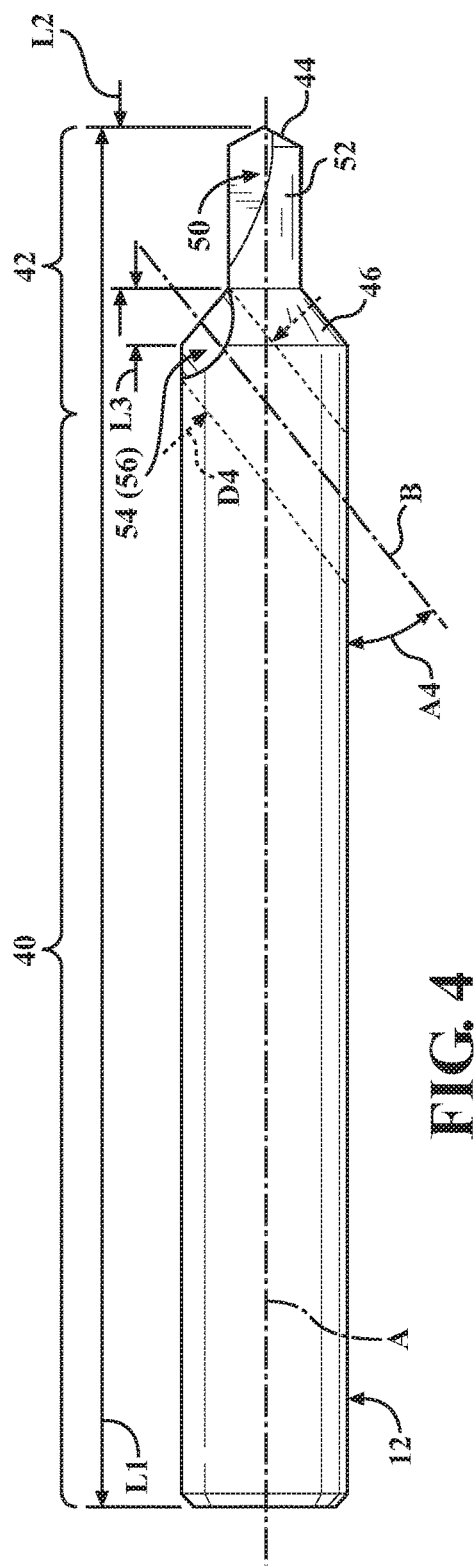
FIG. 3
FIG. 4

CUTTING TOOL FOR CUTTING AND COUNTERSINKING HOLES

TECHNICAL FIELD

The embodiments disclosed herein relate to cutting tools used to process holes in workpieces.

BACKGROUND

Cutting tools and the machining processes that rely on them are hallmarks of the manufacturing industry. In many machining processes, cutting tools are concurrently axially rotated and axially fed into workpieces to produce or otherwise process holes in them. The cutting tools used in these machining processes are the subject of continuous improvement.

SUMMARY

Disclosed herein are embodiments of a cutting tool configured to cut and countersink a hole in a workpiece, and methods of using the cutting tool to machine a workpiece.

In one aspect, a cutting tool includes a shank and a fluted body extending along an axis. The body includes a tip, a chamfer in an axially spaced relationship with the tip and a cross hole with a proximal end opening to the chamfer. The body has a cutting section extending between the tip and the chamfer, and a countersinking section extending along the chamfer. At the cutting section, the body includes at least one hole-cutting edge. At the countersinking section, the body includes a scalloped countersink-cutting edge along a junction of the chamfer and the proximal end of the cross hole.

In another aspect, a cutting tool includes a shank and a body extending along an axis. The body includes a pointed tip, a chamfer in an axially spaced relationship with the tip, two helical flutes extending between the tip and the chamfer, and along the chamfer, and a canted cross hole with a proximal end closest to the tip opening to the chamfer. The body has a cutting section with a drill configuration extending between the tip and the chamfer, and a countersinking section extending along the chamfer. At the cutting section, the body includes two radial chisel edges at the junction of the tip and the two flutes. At the countersinking section, the body includes a scalloped countersink-cutting edge along a junction of the chamfer and the proximal end of the cross hole.

In yet another aspect, a method of machining a workpiece includes axially rotating a cutting tool with a fluted body. The method also includes, concurrently with axially rotating the cutting tool, axially feeding a cutting section of the body, which extends between a tip and a chamfer thereof, into a workpiece. In the method, this thereby uses at least one hole-cutting edge located at the cutting section to process a hole in the workpiece. The method also includes, still concurrently with axially rotating the cutting tool, further axially feeding a countersinking section of the body, which extends along the chamfer thereof, into the workpiece. In the method, this thereby uses a scalloped countersink-cutting edge located at the countersinking section along a junction of the chamfer and a proximal end of a cross hole to countersink the hole in the workpiece.

These and other aspects will be described in additional detail below.

BRIEF DESCRIPTION OF THE DRAWINGS

The various features, advantages and other uses of the present embodiments will become more apparent by referring to the following detailed description and drawing in which:

FIGS. 3 and 4 are different side views of the cutting tool, showing a shank and a body by which the cutting tool is configured to cut and countersink the hole in the workpiece;

DETAILED DESCRIPTION

This disclosure teaches a cutting tool that supports a multi-operational machining process by which the cutting tool cuts and countersinks a hole in a workpiece. The cutting tool has a fluted body whose flutes extend through a cutting section and a countersinking section. In addition to the flutes, the body features a chamfer and a cross hole. A proximal end of the cross hole opens, at the countersinking section, in part across a flute, and in part across the chamfer. In addition to a hole-cutting edge at the cutting section, the body includes a scalloped countersink-cutting edge at the countersinking section along a junction of the chamfer and the proximal end of the cross hole.

Figure 1:
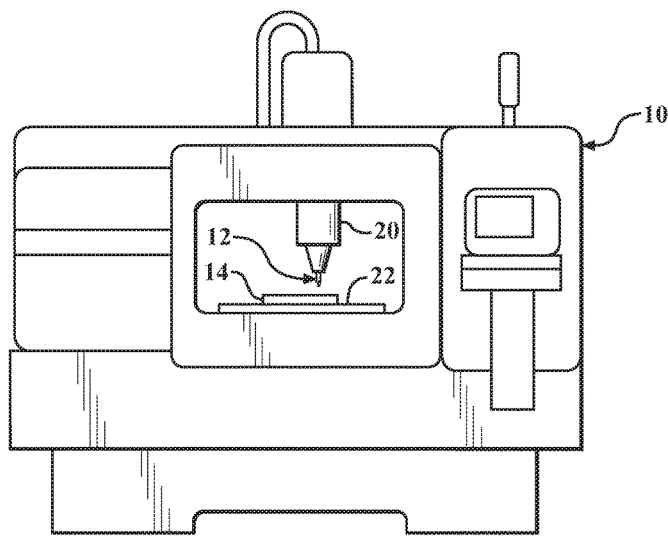
FIG. 1 is a schematic view of a machining center, showing a cutting tool and a workpiece supported by the machining center.

FIG. 1 shows an example of a machining center 10. In general, the machining center 10 uses cutting tools to impart desired characteristics to workpieces by removing material from them. Below, the operation of the machining center 10 is described with reference to a cutting tool 12 and a workpiece 14. Although this description is focused on the cutting tool 12, the machining center 10 could be similarly operated using additional cutting tools to remove material from the workpiece 14.

Where, as shown, the machining center 10 is automated, the movement of its components may be powered and subject to computer or other types of numerical control. In other words, the machining center 10 may be a computer numerical control (CNC) machining center 10 or other type of numerical control (NC) machining center 10. Additionally, or alternatively, the movement of some of the components of the machining center 10 could be subject to semi-automated or manual control, or both.

Figure 2:
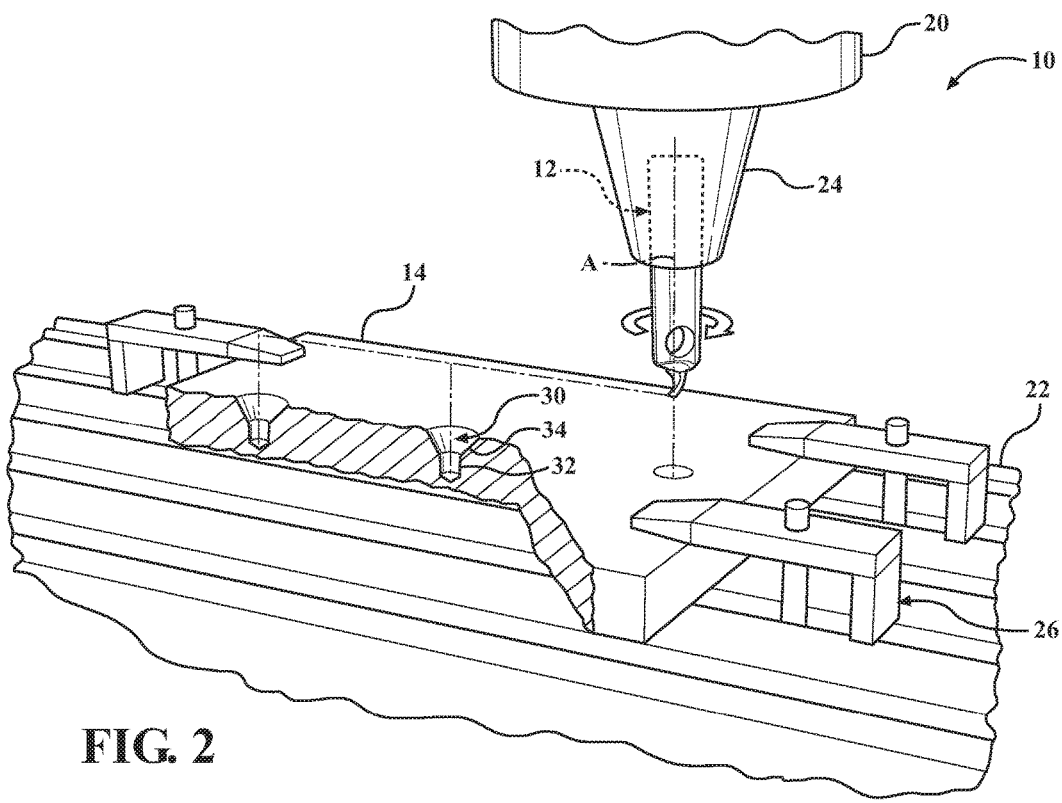
FIG. 2 is a detailed perspective view of the machining center, showing a head supporting the cutting tool and a table supporting the workpiece, as well as a cut and countersunk hole in the workpiece.

The machining center 10 supports both the cutting tool 12 and the workpiece 14. For these purposes, as shown with additional reference to FIG. 2, the machining center 10 includes, among other components, a head 20 and a table 22. With its head 20, the machining center 10 supports the cutting tool 12 for powered rotation about its axis A or, in other words, axial rotation. The head 20 includes a chuck 24, such as a collet chuck, that retentively holds the cutting tool 12 while supporting it for axial rotation. The head 20 may also include a motor or other device that powers the axial rotation of the cutting tool 12. With its table 22, on the other hand, the machining center 10 supports the workpiece 14. As shown, the table 22 includes a clamping system 26 that retentively holds the workpiece 14.

Concurrently with the axial rotation of the cutting tool 12, either the head 20 or the table 22, or both, are subject to selective positioning by the remainder of the machining center 10. In operation, the machining center 10 supports the axially rotating cutting tool 12 and the retentively held workpiece 14 for relative movement. Under this relative movement, the cutting tool 12 is fed into the workpiece 14 to remove material from it. This relative movement includes translational relative movement between the cutting tool 12 and the workpiece 14 along the axis A of the cutting tool 12 or, in other words, axial movement. Under this axial movement, the cutting tool 12 is axially fed into the workpiece 14 to remove material from it in a manner that produces or otherwise processes a hole 30 in the workpiece 14 (one indicated, with the others being identical).

Beyond this axial movement, the machining center 10 may support the cutting tool 12 and the workpiece 14 in any manner of additional translational or rotational relative movement, or both. The machining center 10 may, for instance, support the cutting tool 12 and the workpiece 14 for reverse axial movement, followed by translational relative movement between the cutting tool 12 and the workpiece 14 along one or more axes normal to the axis A of the cutting tool 12. This relocates the cutting tool 12 with respect to the workpiece 14. With this relocation, the machining center 10 may once again support the cutting tool 12 and the workpiece 14 for axial movement to axially refeed the cutting tool 12 into the workpiece 14 in a manner that produces or otherwise processes another hole in the workpiece 14.

The cutting tool 12 is configured, when axially rotated and axially fed into the workpiece 14, to remove material from the workpiece 14 in a manner that both cuts and countersinks the hole 30 in the workpiece 14. Accordingly, using the cutting tool 12, the machining center 10 in operation carries out a multi-operational machining process by which the hole 30 in the workpiece 14 is cut and countersunk. The hole 30 has, among other features, a wall 32 resulting from the cutting and a countersink 34 resulting from the countersinking. With the cutting tool 12 supporting this multi-operational machining process, the need for the machining center 10 to use two different cutting tools to separately cut and countersink the hole 30 in the workpiece 14 is obviated.

As shown with additional reference to FIGS. 3 and 4, the cutting tool 12 is elongate and generally cylindrical. Along its overall length L1, the cutting tool 12 has a shank 40 and a body 42 opposing the shank 40.

The shank 40 extends along the axis A from one end of the cutting tool 12. The shank 40 is sized, shaped and otherwise configured for accommodation within, and retentive holding by, the chuck 24 included in the head 20 of the machining center 10. Where the chuck 24 is a general purpose collet chuck, the shank 40 may, in a straight shank configuration, have a constant shank diameter D1. To fit a special purpose chuck, the shank 40 could, for instance, be tapered in a tapered shank configuration. In these and other configurations, to facilitate its retentive holding by various general and special purpose chucks, the shank 40 could, for instance, have any combination of an inset neck, a flat across a portion of its face and a tang at the end of the cutting tool 12 from which the shank 40 extends.

The body 42 extends along the axis A from the other end of the cutting tool 12 as the shank 40. At this end, the body 42 includes a tip 44. The body 42 may, in a pointed tip configuration, have a point angle A1 at its tip 44.

The body 42 also includes a chamfer 46. The chamfer 46 is in an axially spaced relationship with the tip 44, which is represented by a tip-to-chamfer length L2. The chamfer 46 broadens the body 42 along a chamfer length L3, with a progressively increasing diameter, from a narrowed diameter D2 between the tip 44 and the chamfer 46 to a relatively broadened diameter D3 along the remainder of the body 42. Where, as shown, the chamfer 46 is frustoconical, the body 42 progressively increases in diameter along the chamfer 46 at a constant chamfer angle A2. While the body 42 has a progressively increasing diameter along its chamfer 46, the narrowed diameter D2 and the broadened diameter D3 of the body 42 are both constant. With the straight shank configuration of the shank 40, the broadened diameter D3 of the body 42 is, moreover, the same as the shank diameter D1.

The body 42 further includes one or more axially extending flutes 50. The body 42, in other words, is fluted. The flutes 50 continuously extend from the tip 44 and along the remainder of the body 42, including between the tip 44 and the chamfer 46, and along the chamfer 46. In a helical flute configuration, the flutes 50 axially extend along the body 42 at a non-zero degree helix angle A3. However, in a straight flute configuration, the flutes 50 could axially extend along the body 42 at a zero degree helix angle A3. Where, as shown, the body 42 includes two flutes 50, or otherwise includes more than one flute 50, the flutes 50 are circumferentially spaced. As a corollary of the flutes 50, the body 42 includes corresponding lands 52 between the flutes 50. The lands 52, like the flutes 50, continuously extend from the tip 44 and along the remainder of the body 42, including between the tip 44 and the chamfer 46, and along the chamfer 46.

The body 42 moreover includes a cross hole 54 with a cross hole diameter D4 passing through the body 42. The cross hole 54 is canted, with its axis B intersecting the axis A of the cutting tool 12 at a cross hole angle A4, and opens to the body 42 at each of its ends. At a proximal end 56 closest to the tip 44, the cross hole 54 opens to the chamfer 46 of the body 42.

Figure 6:
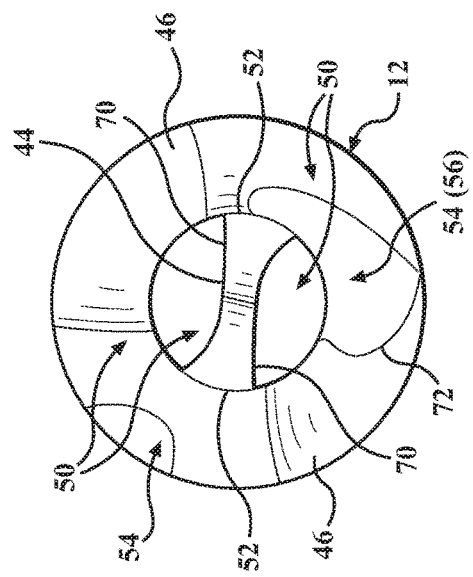
FIG. 6 is an end view of the cutting tool, showing additional details of its body.
Figure 5:
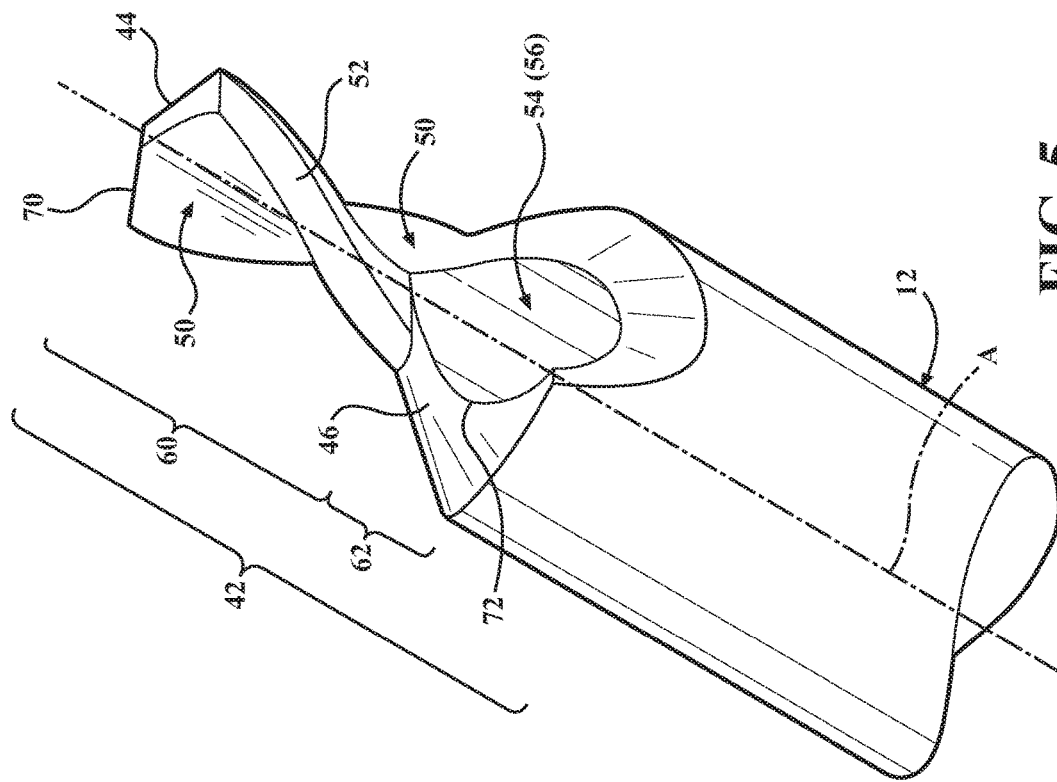
FIG. 5 is a detailed perspective view of the cutting tool, showing its body, as well as a cutting section by which the body is configured to cut the hole in the workpiece, and a countersinking section by which the body is configured to countersink the hole in the workpiece.

As shown with additional reference to FIGS. 5 and 6, along the length of the cutting tool 12, its body 42 has a leading cutting section 60 and a trailing countersinking section 62. In the body 42, the tip 44 is included as part of the cutting section 60, and the chamfer 46 and the proximal end 56 of the cross hole 54 are included as parts of the countersinking section 62. The cutting section 60 commences at the tip 44 and extends between the tip 44 and the chamfer 46, and the countersinking section 62 commences at, and extends along, the chamfer 46. The flutes 50 are common to both the cutting section 60 and the countersinking section 62, and support both of their functions, while the cross hole 54, and particularly its proximal end 56, largely supports the function of the countersinking section 62.

With the cutting tool 12 being axially rotated and axially fed into the workpiece 14, its body 42 is sized, shaped and otherwise configured to cut the hole 30 in the workpiece 14. For this purpose, the body 42 includes one or more hole-cutting edges 70 at the cutting section 60. The hole-cutting edges 70, in a cutting process, remove material from the workpiece 14, in the form of chips, in a manner that progressively produces or otherwise processes the hole 30 in the workpiece 14. As this happens, the flutes 50 lift the material removed from the workpiece 14 from the hole 30 in the workpiece 14.

Where, as shown, the cutting section 60 has the configuration of a drill, the narrowed diameter D2 of the body 42 is a drill diameter, and the tip-to-chamfer length L2 is a drill length. In addition, the one or more hole-cutting edges 70 of the body 42 are respectively embodied by radial chisel edges at the junction of the tip 44 and the flutes 50. In the illustrated twist drill configuration of the cutting section 60, the body 42 includes two hole-cutting edges 70 respectively embodied by two radial chisel edges at the junction of the tip 44 and the two flutes 50. The body 42 could similarly include one or more hole-cutting edges 70 respectively embodied by radial chisel edges at the junction of the tip 44 and the flutes 50 in a center drill configuration of the cutting section 60. In these and other drill configurations of the cutting section 60, with their removal of material from the workpiece 14, the hole-cutting edges 70 progressively produce the hole 30 in the workpiece 14. Its resulting wall 32 is generally smooth and has a diameter matching the narrowed diameter D2 of the body 42.

The cutting section 60 could have other configurations beyond drill configurations where the hole-cutting edges 70 of the body 42 produce the hole 30 in the workpiece 14. For instance, in a reaming configuration of the cutting section 60, the flutes 50 could have respective rakes, and the body 42 could include hole-cutting edges respectively embodied as continuous axial cutting edges extending along the rakes of the flutes 50. In this reaming configuration, a partially processed version of the hole 30 already exists in the workpiece 14 and, with their removal of material from the workpiece 14, the hole-cutting edges progressively process it to make its resulting wall 32 more accurately match the narrowed diameter D2 of the body 42. In a tapping configuration of the cutting section 60, for instance, the flutes 50 could have respective rakes, and the body 42 could include hole-cutting edges embodied as a series of circumferential cutting edges projecting from the lands 52 along the rakes of the flutes 50. In this tapping configuration, a partially processed version of the hole 30 already exists in the workpiece 14 and, with their removal of material from the workpiece 14, the hole-cutting edges progressively process it to make its resulting wall 32 internally threaded.

As the body 42 reaches the depth of the chamfer 46, and with the cutting tool 12 still being axially rotated and axially fed into the workpiece 14, its body 42 is further sized, shaped and otherwise configured to countersink the hole 30 in the workpiece 14. For this purpose, the body 42 includes a scalloped countersink-cutting edge 72 at the countersinking section 62 along a junction of the chamfer 46 and the proximal end 56 of the cross hole 54. The countersink-cutting edge 72, in a cutting process, removes material from the workpiece 14, in the form of chips, in a manner that progressively countersinks the hole 30 in the workpiece 14. Its resulting countersink 34 is generally smooth and has an angle matching the chamfer angle A2 of the chamfer 46. Where, as shown, the cross hole 54 opens in part to the chamfer 46 of the body 42, and in part to a flute 50, the material removed from the workpiece 14 during the cutting and lifted by the flute 50 joins the material removed from the workpiece 14 during the countersinking. As this happens, the joined material removed from the workpiece 14 may be lifted by the flute 50 or lifted by the cross hole 54, or both, from the hole 30 in the workpiece 14.

The workpiece 14 in which the hole 30 is cut and countersunk by the machining center 10 using the cutting tool 12 may be made from metal, including aluminum and its alloys and steel, plastic, polymer and any other manufacturing material.

The body 42 and the remainder of the cutting tool 12 may be made from metal, carbide, composites or any other suitable material with the requisite hardness, hot hardness, toughness, wear resistance and other performance characteristics for cutting and countersinking the hole 30 in the workpiece 14. Suitable materials include high-speed steel (HSS), such as molybdenum (M-series) HSS (e.g., M2, M3, M4, M7, M42, PM M4 etc.) and tungsten (T-series) HSS (e.g., PM T15), any grade of tungsten carbide, titanium carbide or other carbide, and any grade of composite. The body 42 and, optionally, the remainder of the cutting tool 12, may be uncoated (i.e., bright) or coated with suitable coatings for prolonged life and other performance improvements. Suitable coatings include TiN (titanium nitride), TiAlN (titanium aluminum nitride), AlTiCrN (aluminum titanium chromium nitride), AlCrN (aluminum chromium nitride), AlTiN (aluminum titanium nitride), TiCN (titanium carbon nitride), ZrN (zirconium nitride), diamond and diamond-like carbon.

In cases where the workpiece 14 is made of metal, and particularly of aluminum and its alloys, the cutting tool 12, with the illustrated twist or other drill configurations of the cutting section 60 of the body 42, could have, for example, an approximately 135 degree point angle A1 and an approximately 30 degree helix angle A3. In this and other configurations, the cutting tool 12 could further have, for example, an approximately 82 degree chamfer angle A2. In this and other configurations, the cutting tool 12 could further have, for example, an approximately 41 degree cross hole angle A4. In one facet of this and other configurations, the cutting tool 12 could further have any combination of an approximately 0.375 to 0.453 inch common shank diameter D1 and broadened diameter D3 of the body 42, an approximately 0.177 to 0.228 inch narrowed diameter D2 of the body 42, an approximately 0.25 inch cross hole diameter D4, an approximately 0.437 inch tip-to-chamfer length L2 and an approximately 3.5 to 5 inch overall length L1. In another facet of this and other configurations, the cutting tool 12 could further have any combination of an approximately 0.437 to 0.5 inch shank diameter D1, an approximately 0.437 to 1 inch broadened diameter D3 of the body 42, an approximately 0.141 to 0.516 inch narrowed diameter D2 of the body 42, an approximately 0.25 to 0.375 inch cross hole diameter D4, an approximately 0.437 to 1 inch tip-to-chamfer length L2 and an approximately 4 to 4.5 inch overall length L1.

In an example method of manufacturing the cutting tool 12, a cylindrical blank may be turned from the broadened diameter D3 of the body 42 to the narrowed diameter D2 of the body 42 to form the chamfer 46. Then, the cross hole 54 may be drilled through the body 42, and reamed. After a heat treatment, the shank 40 of the partially manufactured cutting tool 12 may be ground to the common shank diameter D1 and broadened diameter D3 of the body 42, and its body 42 may be ground to form the flutes 50 and the tip 44. The body 42 and, optionally, the remainder of the cutting tool 12, may then be coated.

In addition to obviating the need for the machining center 10 to use two different cutting tools to separately cut and countersink the hole 30 in the workpiece 14, the cutting tool 12 has proven to eliminate various competing constraints of the multi-operational machining process by which the hole 30 in the workpiece 14 is cut and countersunk using the cutting tool 12. These competing constraints include, for instance, higher axial rotation speeds, for an overall faster multi-operational machining process, and reduced chatter, for an overall improved surface finish of the resulting wall 32 and countersink 34 of the hole 30 in the workpiece 14. Due at least in part to the inherent balance in the cutting tool 12, the cutting tool 12 has proven effective to cut and countersink the hole 30 in the workpiece 14 with substantially no chatter even at axial rotation speeds of approximately 12,000 RPM and higher. These axial rotation speeds can be achieved when the cutting tool 12 is made from HSS in cases where the workpiece 14 is made of metal, and particularly of aluminum and its alloys.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cutting tool, comprising:
   a shank extending along an axis; and
   a fluted body extending along the axis, the body including a tip, a chamfer in an axially spaced relationship with the tip and a cross hole with a proximal end opening in part to the chamfer, and in part to a flute, and having a cutting section extending between the tip and the chamfer, at which the body includes at least one hole-cutting edge, and a countersinking section extending along the chamfer, at which the body includes a scalloped countersink-cutting edge along a junction of the chamfer and the proximal end of the cross hole.

2. The cutting tool of claim 1, wherein the body is made from high-speed steel.

3. The cutting tool of claim 1, wherein the body is helically fluted.

4. The cutting tool of claim 1, wherein the tip is pointed.

5. The cutting tool of claim 1, wherein the chamfer broadens the body from a constant narrowed diameter between the tip and the chamfer.

6. The cutting tool of claim 1, wherein the cross hole is canted, and the proximal end of the cross hole is closest to the tip.

7. The cutting tool of claim 1, wherein the cutting section has a drill configuration, and the at least one hole-cutting edge is at a junction of the tip and a flute.

8. The cutting tool of claim 1, wherein the body includes two flutes, the cutting section has a drill configuration, and the at least one hole-cutting edge includes two radial chisel edges at the junction of the tip and the two flutes.

9. A cutting tool, comprising:
   a shank extending along an axis; and
   a body extending along the axis, the body including a pointed tip, a chamfer in an axially spaced relationship with the tip, two helical flutes extending between the tip and the chamfer, and along the chamfer, and a canted cross hole with a proximal end closest to the tip opening in part to the chamfer, and in part to one of the two helical flutes, and having a cutting section with a drill configuration extending between the tip and the chamfer, at which the body includes two radial chisel edges at the junction of the tip and the two helical flutes, and a countersinking section extending along the chamfer, at which the body includes a scalloped countersink-cutting edge along a junction of the chamfer and the proximal end of the cross hole.

10. The cutting tool of claim 9, wherein the body is made from high-speed steel.

11. The cutting tool of claim 9, wherein the tip is pointed at an approximately 135 degree point angle.

12. The cutting tool of claim 9, wherein the chamfer broadens the body from a constant drill diameter between the tip and the chamfer.

13. The cutting tool of claim 9, wherein the cross hole is canted with respect to the axis at an approximately 41 degree cross hole angle.

14. The cutting tool of claim 9, wherein the two helical flutes extend at an approximately 30 degree helix angle.

15. The cutting tool of claim 9, wherein the cutting section has a twist drill configuration.

16. A method of machining a workpiece, comprising:
   axially rotating a cutting tool with a fluted body; and
   concurrently with axially rotating the cutting tool:
      axially feeding a cutting section of the body, which extends between a tip and a chamfer thereof, into a workpiece, and thereby using at least one hole-cutting edge located at the cutting section to process a hole in the workpiece; and
      further axially feeding a countersinking section of the body, which extends along the chamfer thereof, into the workpiece, and thereby using a scalloped countersink-cutting edge located at the countersinking section along a junction of the chamfer and a proximal end of a cross hole opening in part to the chamfer, and in part to a flute, to countersink the hole in the workpiece.

17. The method of claim 16, wherein processing the hole in the workpiece includes producing the hole in the workpiece.

18. The method of claim 16, wherein the cutting tool is axially rotated at an axial rotation speed of approximately 12,000 RPM or higher.

19. The method of claim 16, wherein the body is made from high-speed steel.

20. The method of claim 16, wherein:
   the body is made from high-speed steel, and the workpiece is made from aluminum;
   the cutting section has a drill configuration, the at least one hole-cutting edge is at a junction of the tip and a flute, and processing the hole in the workpiece includes producing the hole in the workpiece; and
   the cutting tool is axially rotated at an axial rotation speed of approximately 12,000 RPM or higher.

* * * * *